July 25, 1961 A. W. ZMUDA ET AL 2,993,468
APPARATUS FOR COATING WITH ATOMIZED LIQUID
Filed July 22, 1957 5 Sheets-Sheet 2
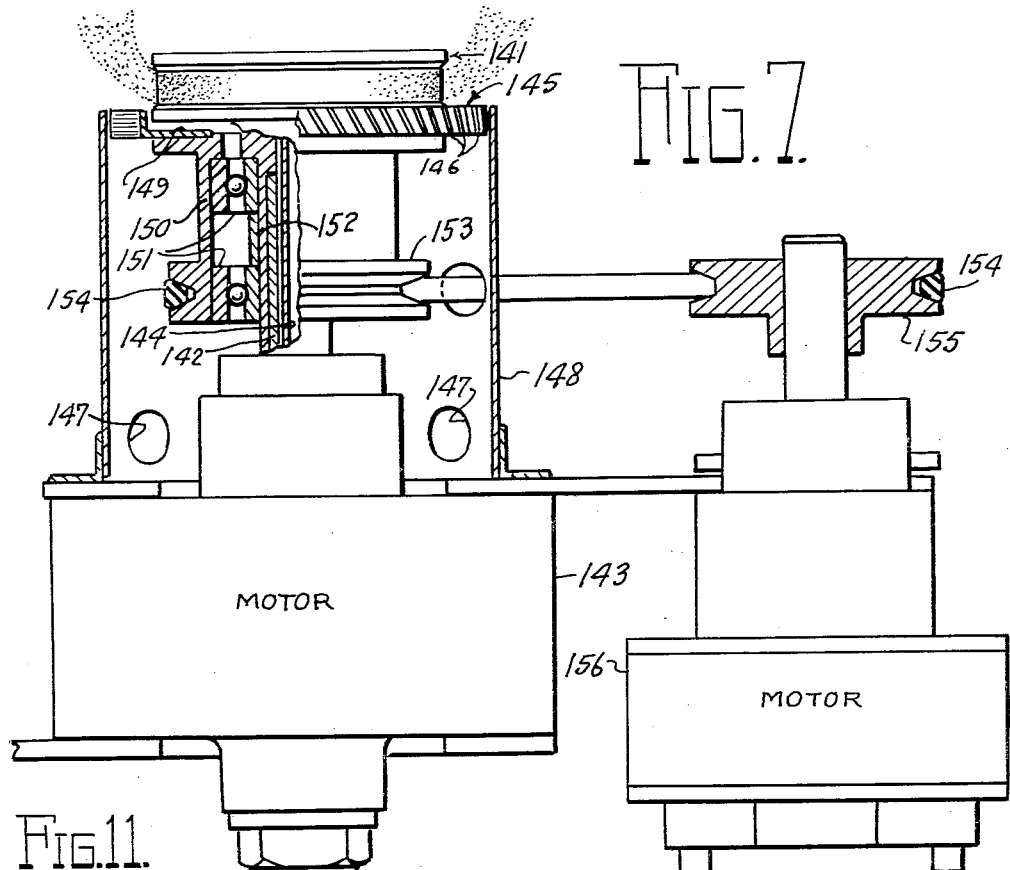
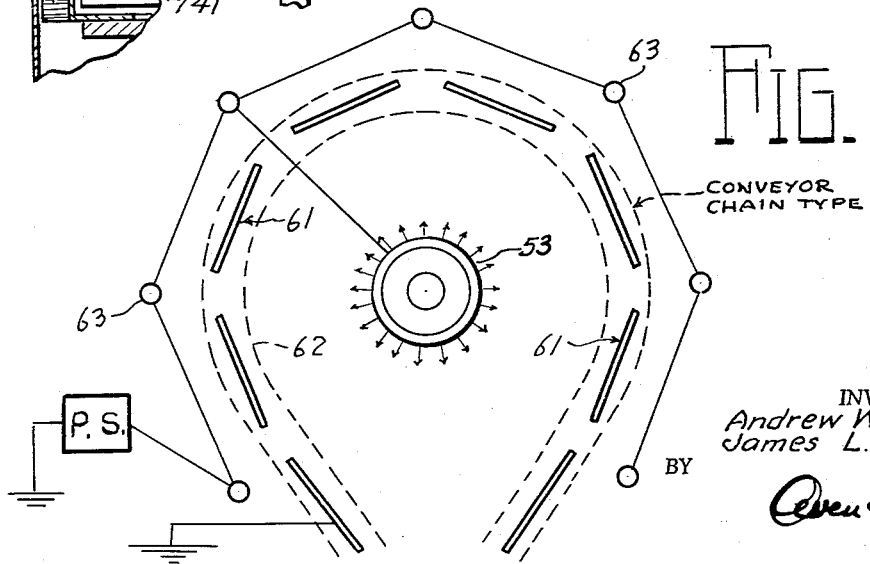
INVENTOR.S
Andrew W. Zmuda
James L. Howe
BY
ATTORNEYS

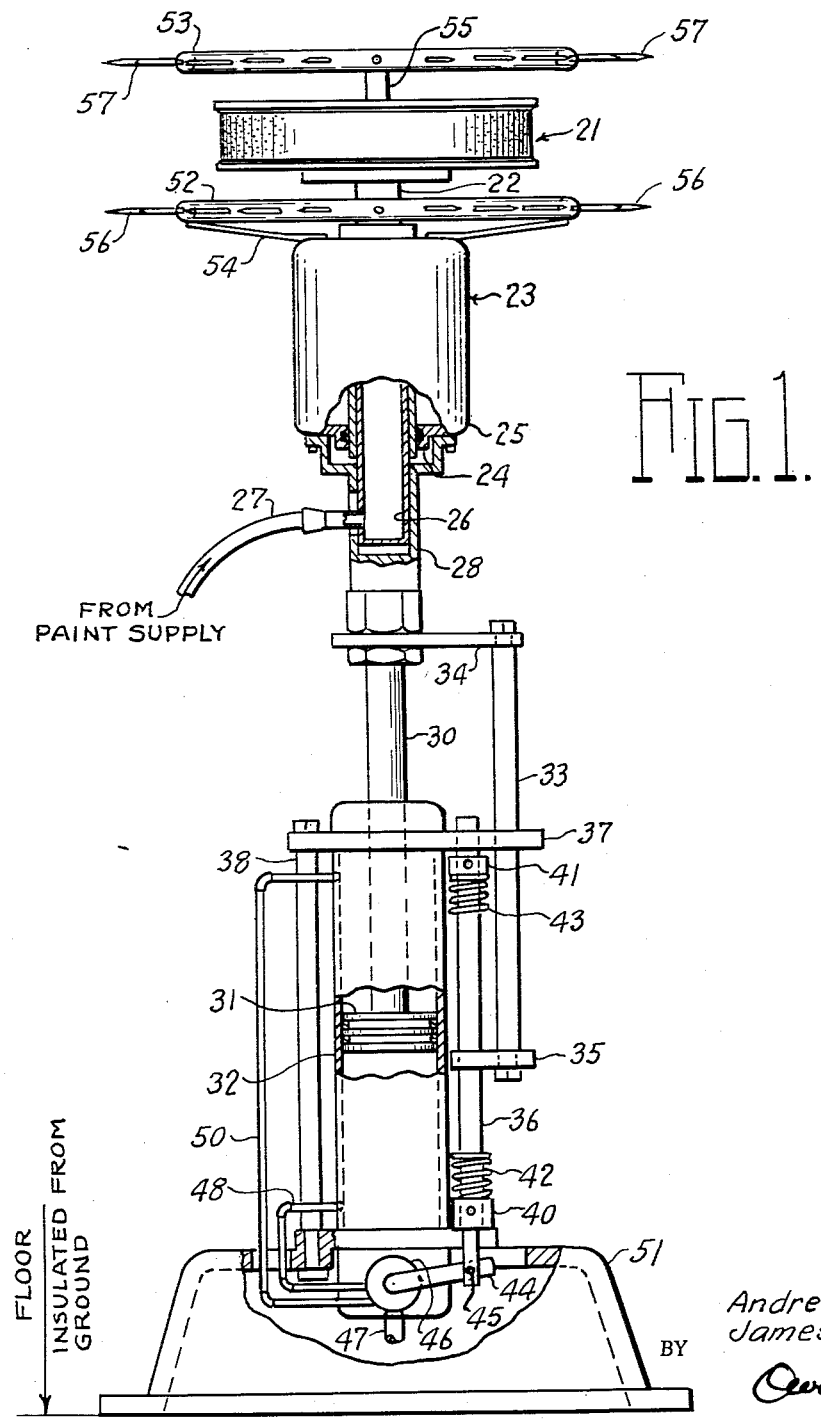

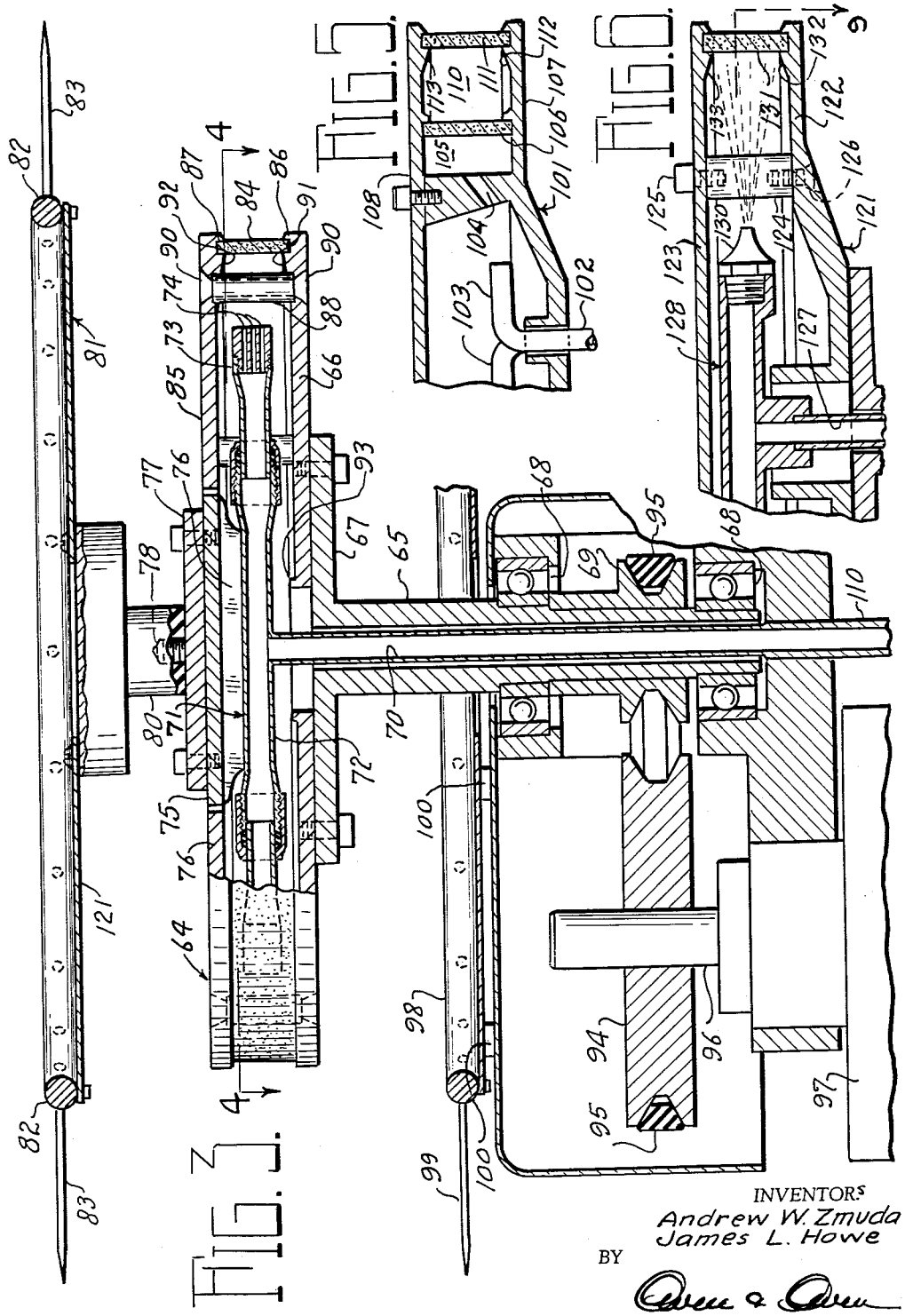

July 25, 1961  A. W. ZMUDA ET AL  2,993,468
APPARATUS FOR COATING WITH ATOMIZED LIQUID
Filed July 22, 1957  5 Sheets—Sheet 4
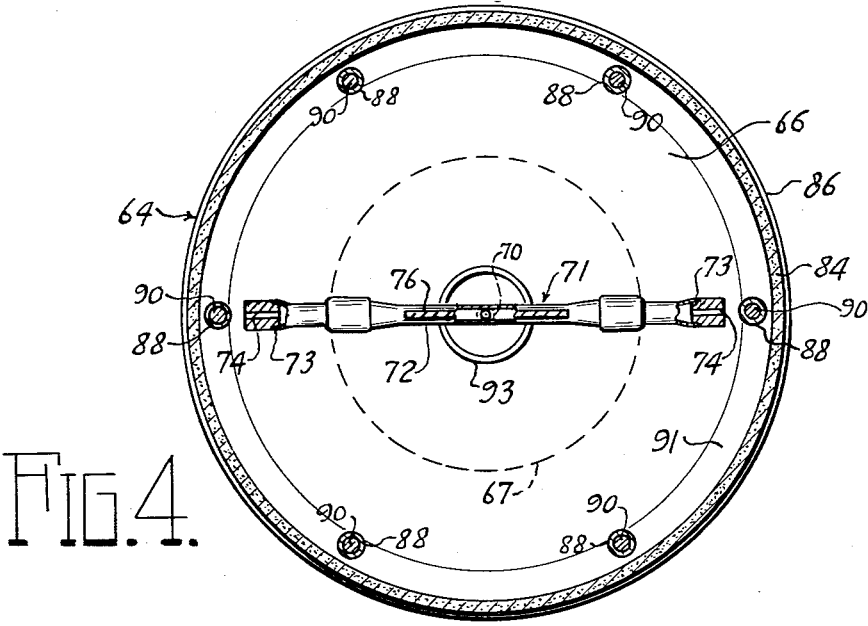
FIG. 4.
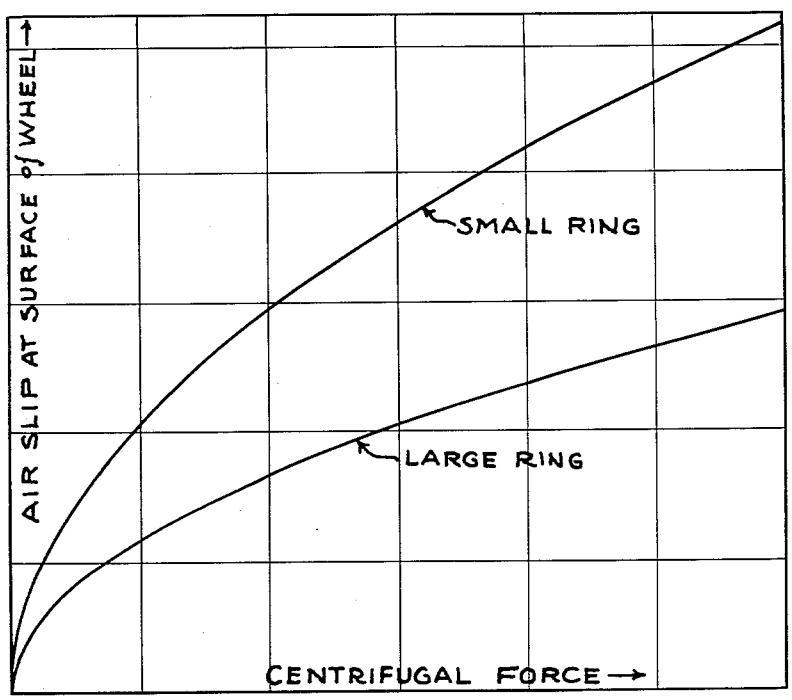
FIG. 6.
INVENTORS
Andrew W. Zmuda
James L. Howe
BY
ATTORNEYS July 25, 1961   A. W. ZMUDA ET AL   2,993,468
APPARATUS FOR COATING WITH ATOMIZED LIQUID
Filed July 22, 1957   5 Sheets-Sheet 5
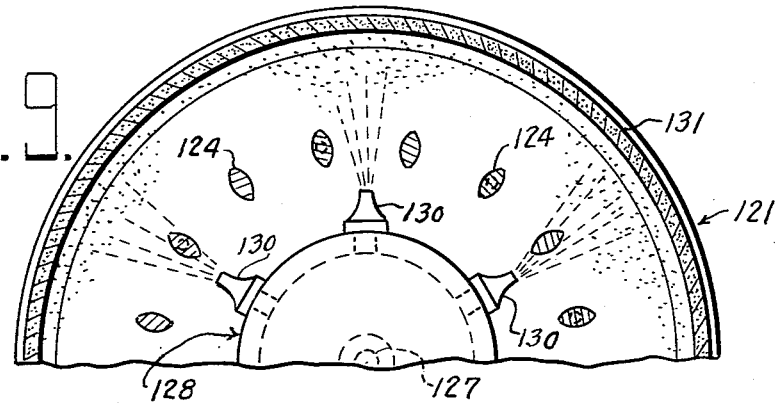
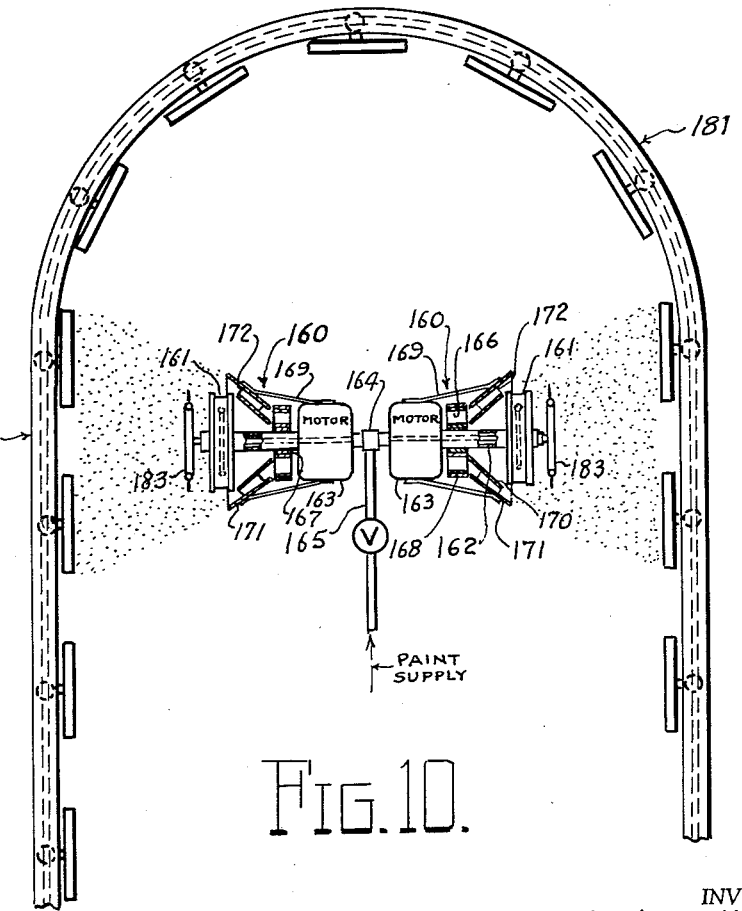
INVENTOR.S
Andrew W. Zmuda
James L. Howe
BY
ATTORNEYS

# United States Patent Office 2,993,468
Patented July 25, 1961

2,993,468
APPARATUS FOR COATING WITH ATOMIZED LIQUID
Andrew W. Zmuda and James L. Howe, Toledo, Ohio, assignors to The De Vilbiss Company, Toledo, Ohio, a corporation of Ohio
Filed July 22, 1957, Ser. No. 673,444
3 Claims. (Cl. 118—300)

This invention relates to a method and apparatus for atomizing and depositing coating materials such as paints and lacquers.

It has heretofore been proposed to atomize and deposit liquid coating materials such as paints and lacquers by three distinct methods, each of which has significant advantages and disadvantages. First and most widely used is the well-known spray gun method in which an air supported stream of liquid is broken up and shaped by properly directed impinging streams of air issuing from the nozzle of the gun. The advantages of this method are well-known and include easy control of the particle size, evenly controlled coating thickness which can readily be varied by the operator, and simplicity of the equipment needed.

The second known method which has more recently found some adaptation involves electrostatic atomization of the paint by flowing it as a liquid over the sharp edge of a metal member on which has been impressed a very high voltage. By concentrating the electrostatic field produced by the high voltage at a sharp edge, the surrounding air is ionized. As the liquid flows to the edge, it forms droplets or minute cusps thereon which attain the same charge as the edge and tend to be repelled therefrom. The particles travel at low velocity and adhere readily to an article that is maintained at a lower, or ground, potential forming an even coating thereon. Overspray of paint is greatly reduced by this method, but it is limited in its paint atomizing capacity, and paint atomized by this method must be thinned out to a low viscosity.

The third presently known method of atomization involves spraying coating liquid under very high pressure through an orifice. The liquid is emitted from the orifice at high velocity and is atomized without the use of air, by rapid release of pressure and by the evaporation of certain low boiling point solvents in the coating liquid. In this method as it is presently proposed, the liquid must first be heated above the boiling point of the low boiling solvents. While a satisfactory coating can generally be obtained with reduced overspray, the apparatus involved in heating the paint and in creating the required high paint pressure appears to severely restrict its possible utility.

The present invention relates to a new method and apparatus for the effective atomization of coating liquid such as paint or lacquer. According to the invention, the coating liquid is supplied to the interior surface of a porous member and caused to pass therethrough to the opposite surface thereof, resisted by the impedance of the porous member so that it tends to ooze out and form small discrete particles. These particles grow in size as the oozing continues. A relative movement is maintained between the surface of the porous member and the adjacent gaseous medium such as air. This movement and the centrifugal force acting on the paint particles is sufficient to cause the particles to be torn or thrown from the surface as soon as a droplet grows to a size such that the surface tension tending to hold it to the porous member is exceeded by the combined forces of windage and centrifugal force. The small discrete particles are then directed toward the articles to be coated and deposited thereon.

The invention combines the advantages of the three previously known methods of atomization with none of the concomitant disadvantages. The new method and apparatus maintain over-spray at a minimum, afford maximum use of the coating material, atomize larger quantities of coating material when desired, achieve a more uniform coating layer, permit the satisfactory atomization of high viscosity, high solid content materials without the necessity of heating to reduce viscosity before spraying.

Other objects and advantages of the invention will be apparent from the following detailed description of preferred embodiments thereof, reference being made to the accompanying drawings, in which—

FIGURE 1 is an elevated view of apparatus embodying the invention, being partially in cross-section;

FIG. 2 is a schematic view of the apparatus of FIG. 1, in a typical operating environment;

FIG. 3 is a central vertical section, with parts broken away, showing a preferred form of atomizing device;

FIG. 4 is a cross-sectional view taken on the line 4—4 of FIG. 3;

FIGS. 5 and 6 are views of modified revoluble heads employed in the invention;

FIG. 7 is a view partially in section of a further modified form of apparatus embodying the invention;

FIG. 8 is a graph showing the relationship between centrifugal force and air slippage for apparatus embodying the invention;

FIG. 9 is a cross-sectional view taken on the line 9—9 of FIG. 6;

FIG. 10 is a view partially in section of another embodiment of the invention shown with a conveyor carrying articles to be coated; and FIG. 11 is a fragmentary sectional view of a modified atomizing ring of the type shown in FIG. 7.

In the subsequently disclosed apparatus, the invention is embodied in a spray head comprising a porous cylindrical ring to which liquid is supplied, preferably intermittently with respect to a given increment of area, as the ring is rotated at a predetermined speed by any suitable drive means. The material from which the ring is formed and details of the invention will be hereinafter described.

In one embodiment, a first distributing means generally distributes the coating material to the spray head and a second distributing means then supplies the material to the inner surface of the porous ring. The centrifugal force of the rotation causes the coating material to move through the pores or interstices of the ring to its outer surface. The coating material emerges therefrom with little or substantially no radial velocity, and discrete particles are torn away from the surface by the relative movement between the ring and the adjacent gaseous medium, and by centrifugal force. The relation between the centrifugal force of rotation and the size of the pores of the porous ring is adjusted so that the force is just sufficient to overcome the resistance to flow created by the pores or interstices. As the particles emerge from the pores at the outer surface of the ring they have, as above stated, little or substantially no radial velocity and tend to remain on the outer surface of the ring until torn off by the combined forces of contact with the less rapidly moving adjacent air and of centrifugal force. The particles are then conveyed and directed toward the article to be coated by any known means such as by an electrostatic field or a laterally moving air stream. With either means of conveyance, the particles do not move with a high velocity and therefore do not strike the article with a force sufficient to cause rebounding. Also, when air is used as the directing and conveying means, the volume is comparatively small so there is no possibility of the particles being excessively dried in transit.

The articles to be coated are spaced from the spray head a sufficient distance to assure uniform distribution within the confines of the conveying and directing means before the particles reach the article. A uniform coating is thereby achieved with no possible formation of stripes or the like.

Furthermore, it will be readily appreciated that the porous ring may be of any desired height. The atomizing surface is determined by the circumference of the atomizing ring multiplied by the height, neither of which have any practical limitations except that the projected area should preferably not exceed the area of the surface to be coated. Any desired amount of coating material may therefore be atomized per unit of time and any desired thickness of coating can be obtained limited, of course, by the quantity which will remain on the work without sagging. As to other relationships of the apparatus, the optimum speed of rotation of the spray head depends upon a variety of factors including the pore size of the atomizing ring, the particle size desired, the surface tension and viscosity of the coating material, and the diameter of the atomizing ring.

The atomizing ring may be formed of sintered metal particles with the resulting pore size depending on the size of the particles and on the pressure and temperature of sintering. In general, an increase in the pore size will result in an increased useful life of the ring. However, increased pore size also requires a higher rotational speed to obtain a given fineness of atomization.

The particle size of the coating material depends on both peripheral speed and centrifugal force for a given pore size. For a particular size of atomizer ring the size of the atomized particles will increase with a decrease in speed, but it has been found that a rather substantial reduction in speed from the optimum can be tolerated and still obtain very acceptable atomization. It has also been found that the centrifugal force acting on the particle as it forms on the periphery of the porous ring has a greater effect on the size of the atomized particles than does the peripheral speed. This appears to be true because the air layer adjacent the porous ring is accelerated due to skin friction to nearly the velocity of the ring surface itself. Since all of the conditions of particle formation are uniform, a very uniform particle size results with no "fines" or large droplets or globules in the spray.

However, the effect of skin friction on the peripheral velocity of an adjacent air layer is less pronounced in the case of a small ring than in the case of a larger ring. The air layer tends to resist following the rapid change in angularity present in the small ring and tends by its own inertia to flow tangentially to the ring. If centrifugal force remains the same in two different diameter rings, the force of windage or air slippage tending to remove droplets becomes relatively greater with respect to the smaller size ring and droplets of smaller and more uniform size will be thrown away therefrom. The smaller ring is capable of satisfactory operation over a greater range of speed than a larger ring because of the effect of windage on atomization. Thus, if the sole consideration were uniform particle size it would appear that a small, high speed ring should be used. However, the atomizing capacity of such a ring is obviously less than that of the larger ring because of the limitations of the available area and volume of the smaller ring. It is also desirable to use a lower rotative speed to reduce bearing wear and unbalanced forces.

These conclusions have been derived from experiments. In one case, for example, a porous ring 7.225 inches in diameter was operated at a speed of 6000 r.p.m., creating a centrifugal force approximately equal to that of a porous ring 2.22 inches in diameter rotated at a speed of 10,000 r.p.m. The peripheral speed of the large ring was 11,000 f.p.m. and that of the small ring was 6500 f.p.m. Under these conditions, the quality of atomization was substantially equal for both rings and both were entirely satisfactory.

The rings were then rotated at slower speeds. The large ring was rotated at 3400 r.p.m. to give approximately the same centrifugal force as that of the small ring rotated at 5800 r.p.m. This force was approximately one-third of the centrifugal force created at the higher speeds. The peripheral speed of the large ring was 6500 f.p.m. and that of the small ring was 4000 f.p.m. The quality of atomization differed considerably. That of the small ring was uniform and fine, being entirely satisfactory for coating. That of the large ring was irregular and some excessively large particles were formed.

This is explained by a comparison of curves for these two rings, obtained by plotting air slippage against centrifugal force. As shown in FIG. 8, the curves for both rings appear as the upper halves of horizontally disposed parabolas having their apices at the junction of the abscissa (centrifugal force) and ordinate (air slippage). The slope of the curve for the small ring is greater than that of the curve for the large ring at all corresponding increments. This is particularly true at slower speeds. For any given centrifugal force, the slippage is greater for the small ring and, hence, a greater range of rotational speeds enables effective atomization for the small ring than for the large ring.

To obtain optimum control of atomization, the coating material is applied to the spray head in a manner and at a rate such that there is never a continuous flow through any given portion of the ring. The supply to the interior is thus preferably intermittent with respect to any particular area. If the flow of material to the head is at too high a rate the head will tend to be overly filled with the material. The centrifugal pressure of the material on the inner surface of the atomizing ring will thereby be increased, causing the material to flow at a faster rate through the porous ring and to emerge at a substantial radial velocity. The material will then form larger particles on the outer surface before atomization can occur and larger and very non-uniformly sized atomized particles will result. Once the head begins to fill and a constant or continuous layer of material begins to build up on the inner surface of the porous ring, the control of atomization is lost.

It has been found that, unlike devices used with other methods of atomization, apparatus constructed in accordance with the present invention permits very viscous paints and enamels to be satisfactorily atomized without the use of heat. With other methods it has been necessary to heat the paint or enamel to reduce its viscosity to the point where it could be satisfactorily atomized. Where a high-solids-content paint or lacquer is to be atomized the present method and apparatus appears to be very satisfactory by reason of the fact that variations in viscosity do not appear to affect the atomizing properties of a material to any significant extent. In the case of paints, lacquers and other usual coating materials, the surface tension of a high viscosity material is about the same as the surface tension of a low viscosity material. In apparatus constructed in accordance with the present invention it is not necessary to supply a force which disrupts a solid stream to form the atomized particles as in both the airless and air atomization methods where the disrupting force must be relied on to cause initial atomization. It is apparent that in the airless and usual air atomization methods an increase in viscosity directly results in an increase in the force required for atomization, and thus the difficulty of atomization. In the present instance atomization takes place without the application of any corresponding disrupting force since the material is formed into small increments merely by passing through the porous ring.

Turning now to the specific embodiments of the invention shown in the drawings, FIG. 1 shows an apparatus suitable for coating articles having a vertical height greater than the normally available vertical range of a fixed atomizing head so that provision is made for vertical reciprocation of the head in a manner known in the art. As there shown, the apparatus includes a porous cylindrical spray head 21 mounted in any suitable manner on a hollow motor shaft 22. The shaft 22 is driven, in the form shown, directly from a motor 23 and is supported in suitable bearings 24 attached to a motor housing 25. Within the hollow motor shaft 22 is a fixed paint supply tube 26 which is connected to a flexible tube 27 extending from a source of paint or coating material, not shown.

The motor and spray head are mounted on a support 28 which, in the reciprocating form shown, is connected to a piston rod 30 and to a piston 31 operating in a power cylinder 32. The piston rod 30 is connected by an arm or bracket 34 to a reciprocating rod 33 carried parallel to the piston rod and connected at its lower end to a shifting dog 35 which surrounds a shifting rod 36. The rod 33 is guided in its movements by a bracket arm 37 which also guides the upper portion of the shifting rod 36. A supporting rod 38 is disposed at the opposite side of the cylinder 32 for the purpose of mounting the shifting parts.

The shifting dog 35 operates lower and upper stop collars 40 and 41 which are pinned adjustably to the rod 36 and suitable springs 42 and 43 are interposed in the path of the dog so that no destructive pounding contact can occur between the dog and the collars 40 and 41. At its lower end, the shifting rod 36 is connected by means of an arm 44 and pin 45 to a valve 46 which controls the flow of operating fluid from a source 47 into lines 48 and 50 running respectively to the lower and upper end of the cylinder 32. When the shifting rod is in its upper position the valve 46 connects the supply line 47 to line 50 which supplies power fluid to the top of the cylinder, driving piston 31 down. This motion continues until the shifting dog 35 abuts collar 40 (by compressing spring 42) and shifts lever 44 to move the valve to the opposite position in which the ports are so disposed that line 47 is brought into communication with the line 48 leading to the lower side of the cylinder 32. The fluid then flows from the source into the lower side of the cylinder, driving the piston upwardly. An appropriate three-way valve on the same axis as valve 46 can be utilized to vent the spent fluid from the cylinder 32 so that the motion of the piston therein is substantially unimpeded. This valve is not shown in the present disclosure.

The entire unit is mounted on an appropriate base 51 and this base is preferably insulated from ground in those instances in which electrostatic conveying of the atomized particles is utilized as in the form shown in FIG. 1. Once the coating material has been atomized by being thrown from the ring 21, it is conveyed to the work by an electrostatic field which originates in spaced, electrically connected rings 52 and 53 mounted over the motor 23 and on each side of the atomizing ring 21, being insulated therefrom by insulating supports 54 and an insulating shaft 55. Each ring is provided with a series of radially extending sharpened electrodes 56 and 57 from which the electrostatic field is emitted or set up. These points of concentration in the field are preferably kept below the point where corona forms to any substantial degree and in practice it has been found that imposing a voltage of substantially 100 kilovolts will bring about the desired results where the work is spaced 15 to 24 inches away from the ring and is at ground potential.

In this form, the unit is well adapted to coat articles having a vertical extent substantially equal to the length of the stroke of the piston 31 or perhaps a few inches greater in length than the stroke. By moving the spray head up and down coating takes place progressively from top to bottom and bottom to top of the units which substantially surround the spray head as shown in FIG. 2.

As there indicated, the work is designated 61 and is shown in the form of panels to be coated. The panels are moved by a loop type conveyor 62 around the spray head at any desired rate. If desired, a series of outer backing electrodes 63 may be used to confine the spray in a manner known in the art. In this figure, the power supply is designated PS and is shown connected to the top ring 53 (and thus electrically to the lower electrode ring 52) and to the line connecting the backing electrodes 63. If the conveyor 62 is of a chain type it can be readily grounded so that it and metallic workpieces carried thereby are of the opposite polarity to that of the electrodes 56, 57 and 63. Paint particles emitted from the spray head 21 will quickly assume the charge or polarity of the electrodes 56 and 57 and will be attracted to the grounded metallic panels 61 carried by the conveyor 62. The rapidity with which the charged particles move to the grounded articles depends more on the intensity of the electrostatic field urging them in that direction than on the inertia imparted to them by the rapidly moving spray head. It has been found in use that the potential difference in the order of 100 kilovolts is adequate to cause rapid movement of the particles with almost no settling or loss.

FIGS. 3 and 4 show a spray head indicated at 64 which is similar to the spray head 21 of FIG. 1. The spray head 64 is adapted to be rotated by a shaft 65 connected to a lower wall 66 of the spray head 64 by means of a plate 67 and suitable bolts. The shaft 65 is journaled in spaced bearings 68 and a pulley 69 is disposed intermediate the bearings. This pulley is connected to a suitable motor for rotating the shaft 65 at a rapid rate relative to the motor speed. A coating material supply tube 70 is concentrically located within the shaft 65 and extends into the spray head 64 above the lower wall 66 where it receives a distributing member 71 which includes a horizontally disposed tube 72 having removable spray tips 73 in which ports 74 are formed. The tips and ports 74 are thus supplied with coating material under low pressure and the material is emitted therefrom. The spray head 64 has a cover plate 75 attached to the distributing member 71 as by a web 76. The plate 75 carries a supporting plate 77 having an upwardly extending threaded fastener 78 for reception of an insulating post 80 which may carry an upper distributing electrode 81 comprising a conducting ring 82 and sharpened discharge points 83, as in the form shown in FIG. 1. In this form, the primary distributing element 71 is stationary, as is the electrode assembly.

In the form of the invention shown in FIGS. 3 and 4 a porous ring is designated at 84 and is mounted between the lower plate 66 and an upper plate 85. The ring 84 is held by means of flanges 86 and 87 which are integral parts of the plates 66 and 85, respectively. The plates are connected by means of posts 88 through which are extended fastening screws 90.

In this form of spray head, as well as the spray head 21 of FIG. 1, the material is sprayed directly from the nozzles 74 in the direction of the porous ring 84 and the velocity of the streams issuing from the nozzles is such that the material reaches the interior of the porous ring without substantial radial velocity. Since any given section of the porous ring is presented to a nozzle only once in each 180° of its rotation, there is ample time for the paint received by the section to travel through to the exterior of the ring under the influence of centrifugal force alone and there is no chance for the material to build up on the interior of the ring before the next increment of material is fed from the opposite nozzle during the course of a single revolution. Accurate control of the atomization is thereby assured at all times.

Annular bevelled portions 91 and 92 are formed either integrally or separately with the lower plate 66 and the top plate 85, adjacent the interior surface of the porous ring 84. It has been discovered that without these bevelled portions 91 and 92, paint that might reach the surface of the upper and lower plates tends to creep across the top and bottom of the porous ring rather than pass through it. The accumulated paint that is obviously not atomized at all overflows the edges of the flanges 86 and 87 as it is moved outwardly by centrifugal force, and is thrown off the ring 84 at the junction of the ring and the flanges 86 and 87 in the form of excessively large drops which may ruin the appearance of the articles being coated. This, of course, may be controlled by using gaskets above and below the porous ring, but such gaskets are a constant source of annoyance because of the desirability of removing the ring for occasional cleaning. It has been found that the bevelled portions 91 and 92 completely eliminate the problem of paint by-passing the ring by preventing accumulation of paint in the corners formed by the flanges 86 and 87 and the plates 66 and 85. To accomplish this, the bevelled portions 91 and 92 must extend inwardly as much as or more than the flanges 86 and 87. Paint may then be thrown off the edges of the bevelled portions 91 and 92 through the ring 84 and past the flanges 86 and 87. Paint cannot accumulate in the corners formed by the flanges and the plates since to do so, the paint would have to diverge after leaving the edges of the portions 91 and 92. This cannot occur because the only force acting on the paint at these points is centrifugal force which has no vertical components that could make the paint diverge. Rather than including the bevelled portions 91 and 92, the plates 66 and 85 may be as thick as or thicker than the width of the flanges 86 and 87 so that the plates 66 and 85 extend inwardly more than the flanges. This tends to increase the weight of the atomizing head and reduce its volume. For these reasons, the bevelled portions are preferred. The plate 66 also has an annular lip 93 which prevents paint from seeping between the shaft 65 and the tube 70.

This form of the invention has the distinct advantage that it is readily cleaned since it is only necessary to remove the post 80 and the top plate 85 by releasing the attaching screws 90. The ring 84 is then presented to the operator so it can be readily lifted out and cleaned. Similarly, the nozzles 73 are made easily removable for cleaning since they are simply threaded on the ends of the horizontal tube 72. It has also been found that cleaning may be readily accomplished by flowing a quantity of solvent material through the nozzles or tips 73 after a painting operation and the nozzles and ring are thereby cleaned simultaneously by the flow of solvent.

The spray head 64 is rotated by any suitable drive through the shaft 65 as by the pulley 69 and a drive pulley 94 connected by a V-belt 95. The pulley 94 is driven through a shaft 96 by an air motor 97, only a portion of which is shown.

A second electrode assembly is positioned below the head 64 and comprises an electrically conducting ring 98, concentrating points 99, and insulating supports 100.

In the form shown in FIGURE 5, the coating material is supplied to the interior of the head which is designated 101 from a supply tube 102 on the axis of rotation and which has a plurality of stationary, radially extending nozzles 103. In this form, primary distributing passages 104 jet the coating material through a space 105 against an inner, very coarse pore, porous ring 106 which is held in place between lower and upper plates of the spray head 101, designated 107 and 108, in any suitable manner. Since the material issues from the primary porous ring 106 in the form of a spray, coarsely atomized, it passes through an intervening space 110 and has time to become more evenly distributed in the space before striking the interior of the porous ring 111 from which it is finally atomized and discharged. The inner porous ring is thus used solely for the purpose of equalizing the flow of fluid against the interior of the final atomizing ring.

Bevelled portions 112 and 113 are formed on the lower and upper plates 107 and 108. These portions are necessary to prevent excessive amounts of paint from being ejected from the junctions of the ring 111 and the flanges of the plates 107 and 108 by functioning in the same manner as the bevelled portions 91 and 92 in the previous embodiment.

It is well known that if a jet of liquid is thrown against the blades of a rapidly moving fan or the like, the liquid will be broken up into atomized particles, however coarse. Such a modification of the invention is shown in FIGS. 6 and 9. As there indicated, the spray head is designated generally 121 and comprises a lower plate 122 and a top plate 123 between which are a series of vanes 124. Appropriate screws 125 and 126 may enter certain of the vanes to hold the parts in assembled relation. The vanes 124 thus act as a series of rapidly moving fan blades to material that may be presented to them in a solid stream. In this modification, paint or coating material enters a vertical passage 127 and is fed outwardly from a stationary distributor 128 to a series of nozzles 130. The nozzles may be threaded into the periphery of the distributor and may thus have any suitable bore and may be easily removed for cleaning. The streams issuing from the nozzles 130 are not jetted against the interior of the porous ring, designated 131 in this modification, but strike first against the rapidly moving vanes 124. These vanes cause a coarse atomization or breaking up of the streams and the centrifugal force or inertia of the streams carries the coarsely atomized particles against the interior of the porous ring 131. The coating material is thus distributed relatively evenly over segments of the interior of the porous ring and flows therethrough to become atomized and discharged from the outer surface thereof.

The plates 122 and 123 are also provided with bevelled portions 132 and 133 to enable proper atomization.

In the embodiments of FIGS. 5 and 6, the feeding tubes 102 and 127 and the nozzles 103 and 130 are stationary. The coating material will then be fed to any incremental area of the porous rings 111 and 131 intermittently, as once each 180° of revolution. The coating material has time to flow through the ring before additional material is supplied to the same area from the opposite or adjacent nozzle. Thus, the coating material cannot build up on the inner surfaces of the rings and close control of atomization can be maintained. While two nozzles, diametrically opposed have been shown in certain figures of the drawings, it should be appreciated that one or any number of nozzles may be used.

The embodiments so far described rely primarily on the electrostatic conveying of the emitted particles but the particles may be conveyed from the spray forming head to the work by an air current, if desired. Such an apparatus is indicated in FIG. 7. In this figure, the porous cylindrical spray-forming head is designated generally 141 and is carried on the end of a hollow rotating shaft 142 driven by a motor 143. Paint is supplied through a concentric, stationary tube 144 from a paint supply source. An axial flow fan 145 is located below the spray head 141 and has blades 146 of any suitable design to create an axial flow of air through inlets 147 in a duct 148 and past the spray head. The fan 145 has a radially extending flange 149 attached to a hub 150 which is rotatably supported through bearings 151 by a tubular member 152 attached to the shaft 142. The housing 150 and the fan 145 are separately rotated by a motor 156 through a pulley 153, a V-belt 154, and a drive pulley 155. The fan 145 is preferably rotated oppositely to the spray head 141 so that the direction in which the air stream tends to rotate is opposite to that of the head 141. This creates a greater tearing force by the air stream on the paint particles emitting from the peripheral surface of the spray head 141, and permits a reduction in the angular velocity of the ring since less centrifugal force will be required to give satisfactory atomization because of the greater effect of air slippage. The atomized particles have lower radial and tangential velocities and control over their direction of passage to the work becomes easier.

As indicated in FIG. 7, the air flow from the vanes 146 picks up the particles almost immediately after their separation from the spray head 141 and conducts them in a direction generally axially of the shaft 142 on which the head is mounted. A work panel spaced from the porous spray head and moving parallel to the diametral plane of the head will receive an even, well distributed coating of atomized material carried to the article by the air stream.

If the atomized particles blown from the spray head by the air stream exhibit any tendency to go back to and accumulate on the head, the porous member of the head may be made as a truncated cone as shown in FIG. 11. As there indicated the ring member designated 159 is of greater diameter adjacent the fan than at the opposite end. The taper of the ring may be regular or curved, depending on the relative effect of centrifugal force and air on the atomized paint particles and is so chosen as to prevent redeposition of the atomized particles.

Another embodiment of the invention is shown in FIG. 10. This embodiment includes two spray devices 160 in back-to-back relationship for the purpose of emitting spray only in restricted zones. These devices use air streams to direct atomized particles and each comprises a spray head 161 axially connected by means of a hollow shaft 162 to a drive motor 163. A coupling 164 is provided to connect a material supply conduit 165 to the spray head so that coating material is supplied to the spray head 161 of each of the units through the hollow motor shaft much as in the form shown in FIG. 3.

Each of the atomizing devices is provided with axial flow fan blades 166 connected to a collar 167 which is attached to the motor shaft 162 so that the fan blades rotate therewith. The blades 166 are connected together by an outer ring 168. Supports 169 are provided which carry a stationary air directing assembly comprising spaced inner and outer shrouds 170 and 171 between which are a plurality of guide vanes 172. The guide vanes are equally spaced with respect to the periphery of the spray head so that the air discharged from the axial flow fan blades 166 is directed smoothly outwardly around the periphery of the spray head. The air streams may tend to rotate slightly in a direction concurrent with the rotation of the head 161 but in general the air flow is laterally across the face of the spray head 161 so that atomized particles emitted therefrom are directed axially of the unit and toward the articles to be coated. In the form shown in FIG. 10 the articles are carried by a loop-type conveyor 181 and are disposed in a plane parallel to the plane of rotation of the spray heads and spaced therefrom.

The movement of the atomized particles, while caused primarily by the air streams from the axial flow fans, may be supplemented by electrostatic forces, if desired, by employing electrodes 183 to charge the particles as they are emitted from the spray heads and by grounding the conveyor lines to attract the charged particles to the articles carried thereby. While the conveyor lines designated 181 are shown as part of a U-shaped conveyor, the runs of the conveyor may be separate and may carry articles in the same or opposite directions. It will be appreciated that in installations where the conveyor lines are already in existence and cannot readily be modified to form a closed loop to cooperate with the 360° spray from the earlier described modifications, the modification of FIG. 10 presents significant advantages. Air transportation of the atomized particles is, for the most part, adequate, but as above noted, it may be supplemented by electrostatic transportation if desired.

One very satisfactory embodiment of the present invention has been found to comprise elements having approximately the following dimensions and operated under substantially the following conditions. It will be appreciated that with changing coating materials and with changes in the other conditions of operations as previously outlined, the dimensions and conditions given are purely illustrative. The porous sintered ring or atomizing element had an outside diameter of 6 inches and an inner diameter of 5¾ inches. The height of the exposed surface was ⅜ inch. The porous atomizing ring was made of sintered bronze particles giving a substantially uniform pore size of approximately .004 inch. A coating material consisting of lacquer or enamel and having a viscosity of approximately 24 seconds was fed to the spray ring and atomized therefrom at a rate of between 30 ounces per minute and 175 ounces per minute. The atomizing head was rotated at a rate of 5000 r.p.m. resulting in a peripheral speed of 8100 feet per minute. The resulting atomization was of a fineness sufficient to give a smooth, uniform coating and compared favorably with the fineness obtained from conventional spray apparatus. There appeared to be no large, unatomized particles in the spray and the number of "fines" was so low as to be negligible. The article to be coated was in the form of rectangular panels spaced 30 inches from the center line of the spray head. In the specific example the electrode rings were spaced above and below the spray head uniformly and were 5 inches apart. A potential difference of 100 kilovolts was established between the electrodes and the article to be coated, which latter was grounded. Backing electrodes were used and were maintained at approximately the potential of the spray head electrodes. In operation the floor beneath the unit remained practically clean, indicating that there was no loss of coating material in transit between the spray head and the articles to be coated.

The embodiments of the invention in the above discussion and accompanying drawings have been intended to be illustrative and not to impose unnecessary limitations on the invention, as set forth in the depending claims.

What we claim is:

1. Apparatus for coating an article with an atomized liquid coating comprising a rotatable porous, annular member, means for rotating said member, means forming a plurality of uniformly circumferentially spaced, stationary orifices spaced inwardly from an interior surface of said rotating member for projecting a coating material through the space between the orifices and said member to portions of the interior surface of said rotating member for flow therethrough and atomization therefrom, means for supplying coating material to said orifice-forming means, means for maintaining the amount of the coating material which is projected onto the member not greater than the amount which is atomized from the member whereby said material flows through said member and is substantially dispersed therefrom before coating material is again projected onto the same area of the interior surface, and means for directing coating material from said member to an object to be coated which is spaced therefrom.

2. Apparatus for coating an article with an atomized liquid comprising a rotatable, porous annular member, means for rapidly rotating said member, at least one stationary nozzle spaced radially inwardly from an interior surface of said member for projecting coating material through a space and onto a portion only of the interior surface of said member, means for feeding coating liquid to said nozzle and from said nozzle through the space to the interior surface of said member at a rate such that any incremental area discharges coating liquid fed thereto prior to receiving subsequent charge from said nozzle, and means for directing coating material from said member to an object to be coated which is spaced therefrom.

3. Apparatus for coating an article with an atomized liquid comprising means for supporting an article to be coated, a rotatable, porous annular member, a first shaft axially connected to said member, means forming at least one stationary orifice within said member and spaced from an interior surface thereof for directing coating material through a space to the interior surface, means for supplying coating material to said orifice-forming means, means for rotating said shaft in one direction, a second shaft located concentrically about a portion of said first shaft, means for rotating said second shaft in a direction opposite to the direction of said first shaft, and a plurality of fan blades attached to said second shaft for rotation therewith to cause a flow of air laterally across said member and toward the article to be coated to carry the atomized liquid to the article.

References Cited in the file of this patent

UNITED STATES PATENTS

| | | |
|---|---|---|
| 923,856 | Kestner | June 8, 1909 |
| 1,861,475 | Hopkins et al. | June 7, 1932 |
| 2,338,779 | Mutch | Jan. 11, 1944 |
| 2,417,929 | Hanson | Mar. 25, 1947 |
| 2,450,599 | Kloda | Oct. 5, 1948 |
| 2,571,069 | Shearman | Oct. 9, 1951 |
| 2,754,226 | Juvinall | July 10, 1956 |
| 2,780,565 | Juvinall | Feb. 5, 1957 |
| 2,795,516 | Miller | June 11, 1957 |
| 2,814,527 | Peebles et al. | Nov. 26, 1957 |